United States Patent
McSwiggan

(10) Patent No.: US 11,381,482 B2
(45) Date of Patent: Jul. 5, 2022

(54) SYSTEM AND METHOD FOR LOGGING AND DISPLAYING ROUTING OF COMMUNICATION

(71) Applicant: Verint Americas Inc., Alpharetta, GA (US)

(72) Inventor: Stephen McSwiggan, Scotland (GB)

(73) Assignee: Verint Americas Inc., Alpharetta, GA (US)

( * ) Notice: Subject to any disclaimer, the term of this patent is extended or adjusted under 35 U.S.C. 154(b) by 208 days.

(21) Appl. No.: 15/645,726

(22) Filed: Jul. 10, 2017

(65) Prior Publication Data
US 2019/0014022 A1 Jan. 10, 2019

(51) Int. Cl.
| | |
|---|---|
| G06F 15/16 | (2006.01) |
| H04L 43/045 | (2022.01) |
| H04L 45/302 | (2022.01) |
| H04L 41/5061 | (2022.01) |
| H04L 41/5022 | (2022.01) |
| G06Q 30/00 | (2012.01) |
| G06Q 10/00 | (2012.01) |
| H04L 41/5074 | (2022.01) |

(52) U.S. Cl.
CPC ........... *H04L 43/045* (2013.01); *G06Q 10/00* (2013.01); *G06Q 30/016* (2013.01); *H04L 41/5022* (2013.01); *H04L 41/5064* (2013.01); *H04L 41/5074* (2013.01); *H04L 45/306* (2013.01)

(58) Field of Classification Search
CPC ............... H04L 43/045; H04L 41/5022; H04L 41/5064; H04L 45/306; G06Q 10/00
USPC ......................................................... 709/224
See application file for complete search history.

(56) References Cited

U.S. PATENT DOCUMENTS

| | | | |
|---|---|---|---|
| 2012/0027191 A1* | 2/2012 | Baril ..................... | H04M 3/436 379/210.02 |
| 2013/0262320 A1* | 10/2013 | Makanawala .......... | G06Q 50/01 705/304 |
| 2014/0153707 A1* | 6/2014 | Rais ...................... | H04L 65/105 379/196 |
| 2015/0016286 A1* | 1/2015 | Ganichev ................ | H04L 49/70 370/252 |

* cited by examiner

*Primary Examiner* — Suraj M Joshi
*Assistant Examiner* — Joel Mesa
(74) *Attorney, Agent, or Firm* — Christopher M. Scherer; DeWitt LLP

(57) ABSTRACT

The present invention allows a user to review the routing of various communications. The system receives incoming communications for analysis by a smart routing engine (SRE) software module. The SRE module analyzes the communication at various system routing points, which is used by SRE to route the communication to an appropriate party. The SRE updates a routing log at each point to ensure a record of the reasons for routing the communication in a certain way. The routing log passes with the communication. This ensures that the ultimate recipient of the communication understands why they have received the communication and reduces the time required for a communication to be acted upon.

19 Claims, 4 Drawing Sheets

SYSTEM AND METHOD FOR LOGGING AND DISPLAYING ROUTING OF COMMUNICATION

FIELD

The present disclosure is directed to a method for computer analysis, specifically a method of logging the routing of an incoming communication and providing the record to a user.

BACKGROUND

In a modern high-volume customer engagement center (CEC), it is often the case that a customer contact or communication may travel through multiple routing decision points before ultimately being delivered to a customer service representative (CSR). In order to efficiently handle and distribute the high volumes of communications being received in a modern CEC there may be multiple decision making and routing systems (both automated and manual) involved in analyzing and transferring the communication within the CEC until it is ultimately delivered to a CSR for handling. Examples of systems that can be involved in this decision making and routing include interactive voice response (IVR) systems, rules engines, routing engines, workforce optimization systems, and back office handling systems, among others.

It is, however, often the case that when a CSR ultimately receives the communication for handling, information about this decision making and routing, and hence the context of delivery of the communication, is lost. As a result, when the CSR receives the communication, they have little idea as to why the communication has been delivered to them. A CSR with multiple responsibilities may need to expend valuable time determining just why the communication was delivered to them. If the CSR makes an incorrect assessment, it may delay or cause errors in responsive communications with the customer. The context of the systematic decision making and routing throughout the duration of communication handling may be instructional to the CSR and should be visible them when handling a communication.

For example, a CSR assigned to deal with messages involving either a high-value client or a specific, highest-priority issue may mistakenly think that a message from the client about the issue was delivered to them based on the client, not the issue. This could result in the CSR deprioritizing the high-value client in favor of a different client known to be experiencing the highest-priority issue. By the time the CSR realizes their mistake, the client relationship may be damaged. In another example, a CSR may receive an email because it was flagged for potential fraudulent activity, but not know why the email was flagged, requiring the CSR to undertake time-consuming review.

There is an unmet need in the art for a system and method capable of automatically keeping a readable record of the routing decisions for a communication. There is a further unmet need in the art for a system and method capable of presenting these routing decisions to the handling agent to enable them to best understand the context of the allocated communication.

SUMMARY

An exemplary embodiment of the present application is a method for logging communication routing. When a system receives a new communication through a system entry point, it creates a routing log associated with the communication and updates the routing log with an initial log entry denoting the system entry point. The communication routes through a system routing point and updates the routing log with a decision log entry. The communication and routing log are transmitted and then opened for display.

Another exemplary embodiment of the present application is a system for logging communication routing. The system includes a processor and a non-transitory computer readable medium programmed with computer readable code that upon execution by the processor causes the processor to execute the above-mentioned method for logging communication routing.

Another exemplary embodiment of the present application is a non-transitory computer readable medium programmed with computer readable code that upon execution by a processor causes the processor to execute the above-mentioned method for logging communication routing.

The objects and advantages will appear more fully from the following detailed description made in conjunction with the accompanying drawings.

BRIEF DESCRIPTION OF THE DRAWING(S)

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

CEC systems allow CSRs to engage with customers in a controlled manner. By providing a log of the automated and/or manual analysis and routing of incoming communications, the CEC system can allow an organization to achieve several key benefits. First, the communication routing log will allow a CSR to know exactly why a communication was routed to them, ensuring appropriate, timely reply to the communication. Second, the communication routing log will permit the organization to determine how misrouting occurred for any misplaced or misguided communications. Third, the communication routing log will permit the organization to analyze its routing processing rules and standards using real data, allowing effective updates to the rules and standards when necessary.

In embodiments, it is desirable for the system to log both information on both the initial system entry point of a communication and any subsequent system routing points that the communication passes through on the way to its ultimate destination. This permits the system to document all decisions made with regard to the routing of received communications and provide this routing log to the communication recipient, allowing them to understand the reasons they received the communication. In an embodiment, it is desirable to store the communication and/or routing log. In another embodiment, it is desirable to log whether a decision is manual or automated, and provide an indication in the routing log. In yet another embodiment, it is desirable to transmit the communication and/or routing log out of the system for additional analysis.

Figure 1:
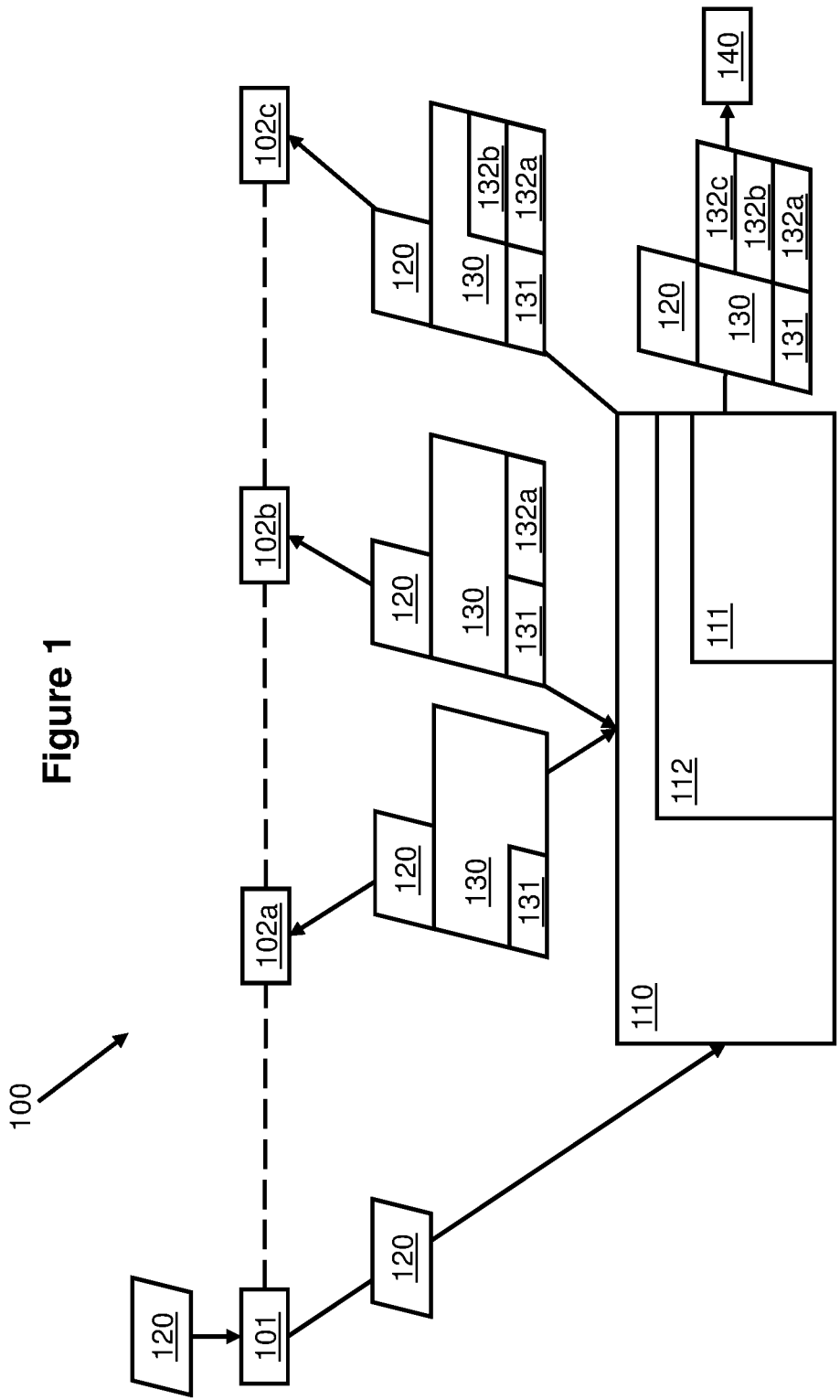
FIG. 1 depicts an exemplary embodiment of a CEC system for logging communication routing.

FIG. 1 depicts an exemplary embodiment of CEC system 100 for logging communication routing.

CEC system 100 includes a smart routing engine (SRE) 110 having a SRE software module 111 and an optional SRE storage 112. SRE 110 may be a processor or a combination of a processing system and a storage system. In certain embodiments, instead of SRE 110, system 100 may utilize one or more IVR systems, rules engines, workforce optimization systems, back office handling systems, and/or any combination thereof.

SRE 110 receives communications 120 from outside of CEC system 100 through a system entry point 101 and creates a routing log 130 using SRE software module 111. Optionally, SRE 110 may pass a copy of communication 120 and/or routing log 130 to internal or external SRE storage 112 for permanent or temporary storage. SRE 110 may also transmit a copy of communication 120 and/or routing log 130 to an external section for analysis. Stored or transmitted communications 120 and/or routing logs 130 may allow large-scale analysis of communications traffic and trends, as well as the efficacy of routing rules, standards, and/or processes. Communication 120 may be a live telephone call, a recorded telephone call, information gathered or transcribed from a telephone call, a voice mail message, email, an online posting, a direct message from a customer, a communication from a third party, a message from a customer forwarded by a third party, an electronic copy of mail sent by post or courier, any other communication, or any combination thereof.

Routing log 130 contains an initial log entry 131 denoting the particular system entry point 101. System entry point 101 may include a system input, a telephone or IVR system, an electronic mail or messaging system, a scanner, or any other means by which communication 120 can enter system 100. Initial log entry 131 may include identifying information on the author of communication 120, identification of system entry point 101, the type of communication, the date and time of entry, and information on the initial processing and/or entry of communication 120. Every time communication 120 is routed to a system routing point 102 in the routing process, SRE 110 updates routing log 130 with a decision log entry 132. Decision log entries 132 may include the decision points, routing reasons, interim or ultimate destinations, and indications of whether the routing was manual or automated. Manual routing may occur if the communication is directed to the wrong CSR. By way of non-limiting example, in such a case, the CSR's command to SRE 110 to route communication 120 to another CSR would be another routing point 102 in the routing process, SRE 110 updates routing log 130 with another decision log entry 132

By way of non-limiting example, a communication 120 entering CEC system 100 through a review page on an organization's website will receive initial log entry 131 denoting that it was submitted through the above website. Due to the negative feedback given on the site, at the first system routing point 102a communication 120 will be automatically routed to a problem resolution team. This decision will be noted in decision log entry 132a. Due to the service complained about, at the second system routing point 102b communication 120 will be automatically routed to members of the team with experience in that particular service division. This decision will be noted in decision log entry 132b. Upon reviewing communication 120, the receiving CSR will observe that the feedback lists a serious violation of the organization's service protocol and should have been routed to a senior CSR. As a result, the receiving CSR will manually rout communication 120 to the specific senior CSR at the third system routing point 102c. This decision will be noted in decision log entry 132c, then communication 120 and routing log 130 will pass to CEC desktop 140 for the senior CSR. Upon review of routing log 130, this senior CSR will immediately know why they received communication 120.

In the exemplary embodiment, routing log 130 contains three decision log entries 132a, 132b, and 132c corresponding to each of the three system routing points 102a, 102b, and 102c. Other embodiments may have more or fewer decision log entries 132 corresponding to more or fewer system routing points 102. The number of system routing points 102 may vary from system to system, or may vary within the system according to the type or content of communication 120. In the exemplary embodiment, routing log 130 is attached to communication 120. In other embodiments, routing log 130 may be a separate document or appended to the body of communication 120.

SRE 110 may route communication 120 to a specific CSR, a group of CSRs, a specific queue, or a group of queues. By way of non-limiting example, if communication 120 is from a specific high-value customer, it may be routed to a senior CSR to ensure the most rapid, effective response possible. By way of further non-limiting example, if communication 120 includes a physical threat against a business location, it may be routed to a security queue for immediate review and analysis.

CSRs may be identified or grouped by level of authority or skill, skill set, product or service line, department, assigned customers or accounts, prior customer interactions, any other quality, or any combination of qualities. Queues and queue groups may be associated with a level of urgency or importance, with one or more specific issues, types of issue, products, services, product lines, service lines, customers, accounts, departments, or groups of departments, any other quality, or any combination of qualities. CSR groups and queue groups may be predetermined or created and updated dynamically to fit current or anticipated needs. By way of non-limiting example, a predetermined CSR group may include all CSRs of a given authority level. By way of further non-limiting example, a dynamic queue group may include queues for a large, very important customer and a specific time-limited issue; this queue group may be dissolved after the time to resolve the issue has expired.

CEC system 100 also includes at least one CEC desktop 140 used by the CSR for receiving and viewing or listening to communications 120 and/or routing log 130. Routing log 130 may automatically open on CEC desktop 140 before the CSR opens communication 120, may open simultaneously with communication 120, or may require some input or action from the CSR to open.

Figure 2A:
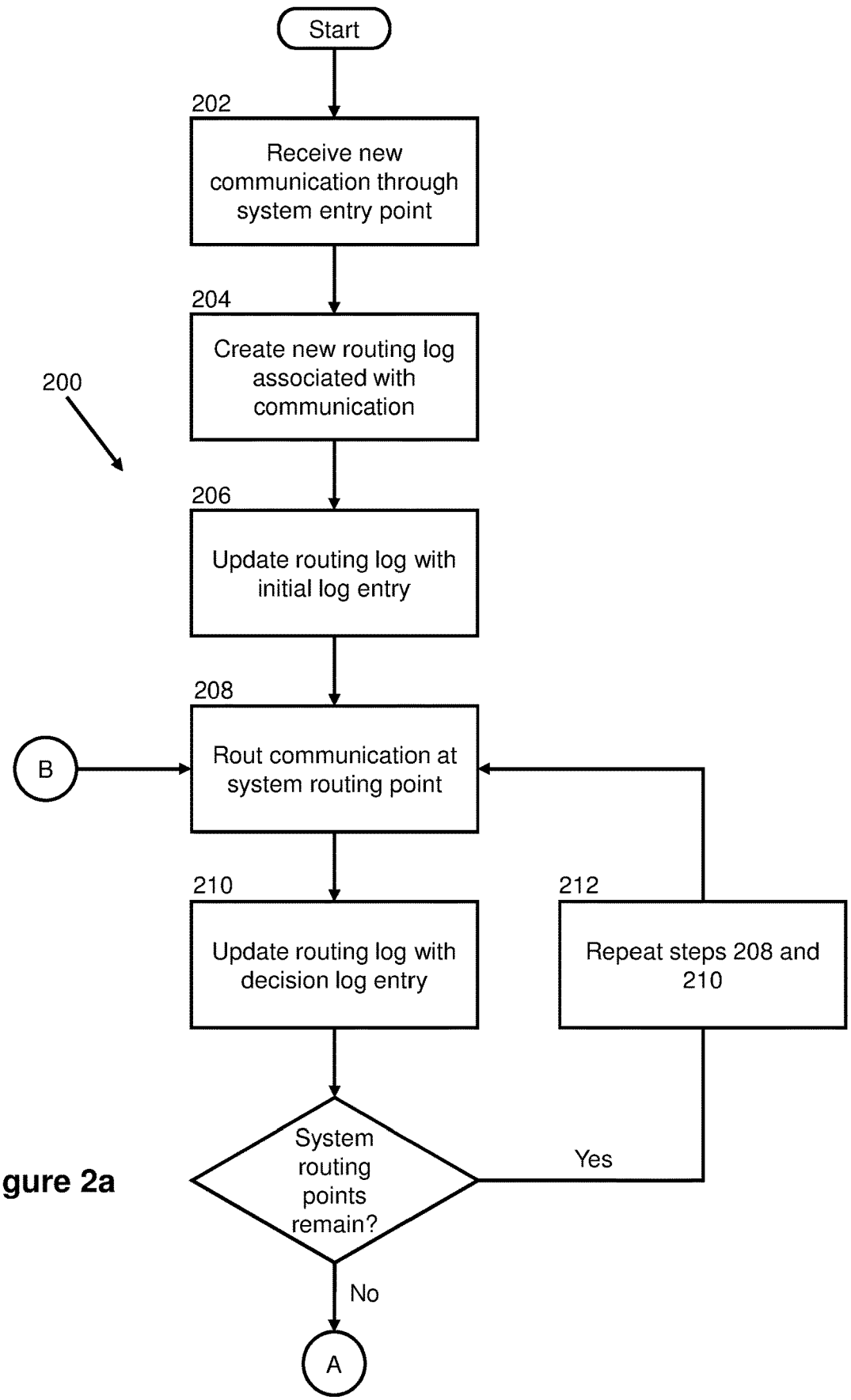
FIGS. 2a and 2b depict a flowchart of an exemplary embodiment of a method for logging communication routing.
Figure 2B:
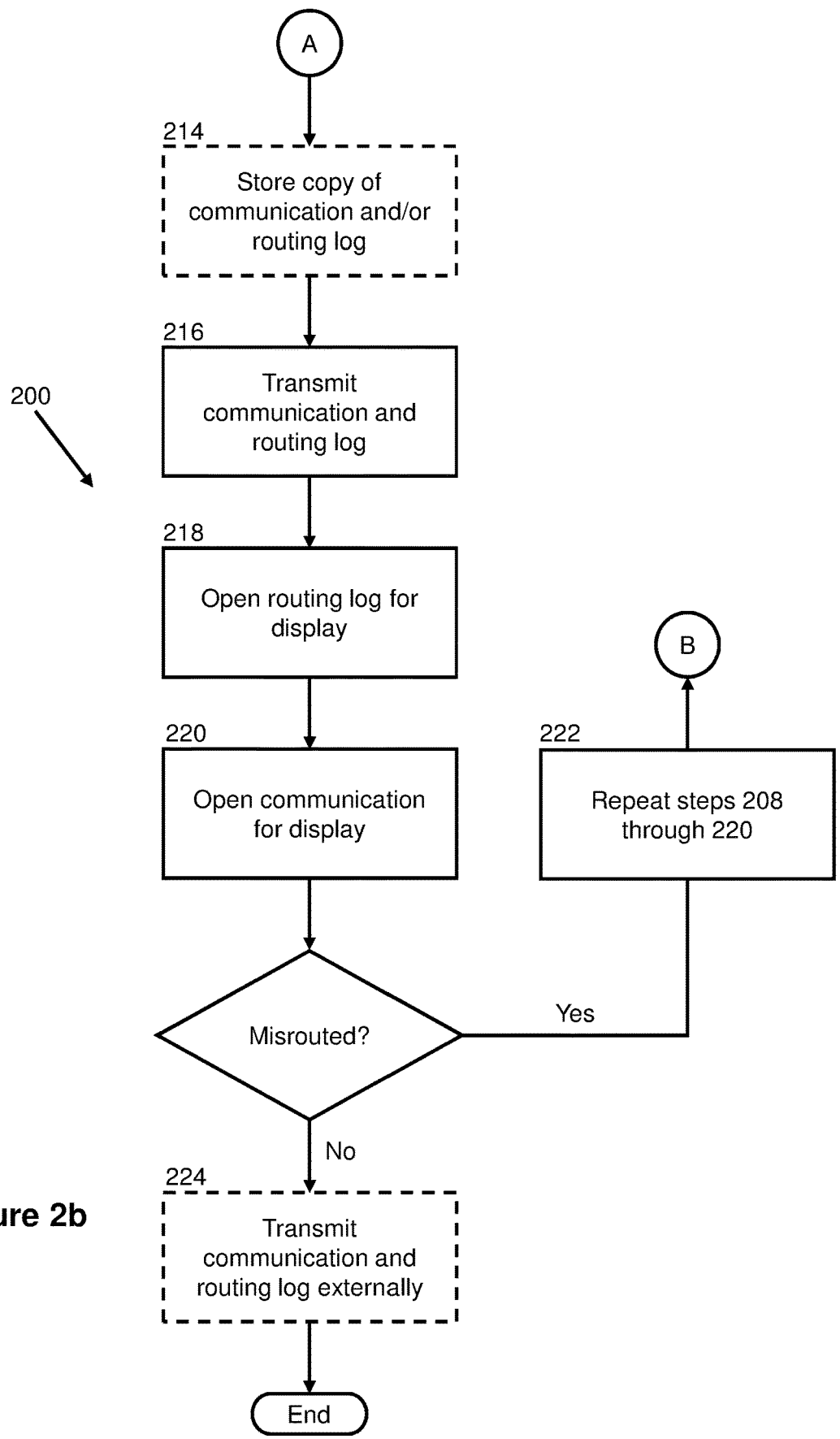

FIGS. 2a and 2b depict a flowchart of an exemplary embodiment of method 200 for logging communication routing.

In step 202, the CEC system receives a new communication through a system entry point.

In step 204, the SRE creates a new routing log associated with the communication. The routing log may be a separate document from the communication, attached to the communication, or appended to the body of the communication.

In step 206, the SRE updates the routing log with an initial log entry denoting the system entry point through which the communication entered CEC system.

In step 208, the SRE routs the communication at a system routing point. Each system routing point may be an automated decision using predetermined criteria or a manual evaluation by reviewing staff.

In step 210, the SRE updates the routing log with a decision log entry. Each decision log entry may include the system routing point, routing reason, destination, and indication of whether the routing was manual or automated.

In optional step 212, the CEC system repeats steps 208 and 210 until no more system routing points remain. The number of system routing points may vary from system to system or from instance to instance of receiving a communication.

In optional step 214, the SRE stores a copy of at least one of the communication or the routing log in internal or external SRE storage.

In step 216, the CEC system transmits the communication and the routing log to a specific CSR, a group of CSRs, a specific queue, or a group of queues.

In step 218, the CEC system opens the routing log for display. The routing log may automatically open on the CEC desktop before the CSR opens the communication, may open simultaneously with the communication, or may require some input or action from the CSR to open.

In step 220, the CEC system opens the communication for display. This step may occur before, after, or simultaneously with step 218.

In optional step 222, the CEC system repeats steps 208 through 220 for misrouted communications. This allows a CSR to return the communication to routing if it was transmitted to the wrong party.

In optional step 224, the CEC system transmits the communication and the routing log to an external section for analysis.

Figure 3:
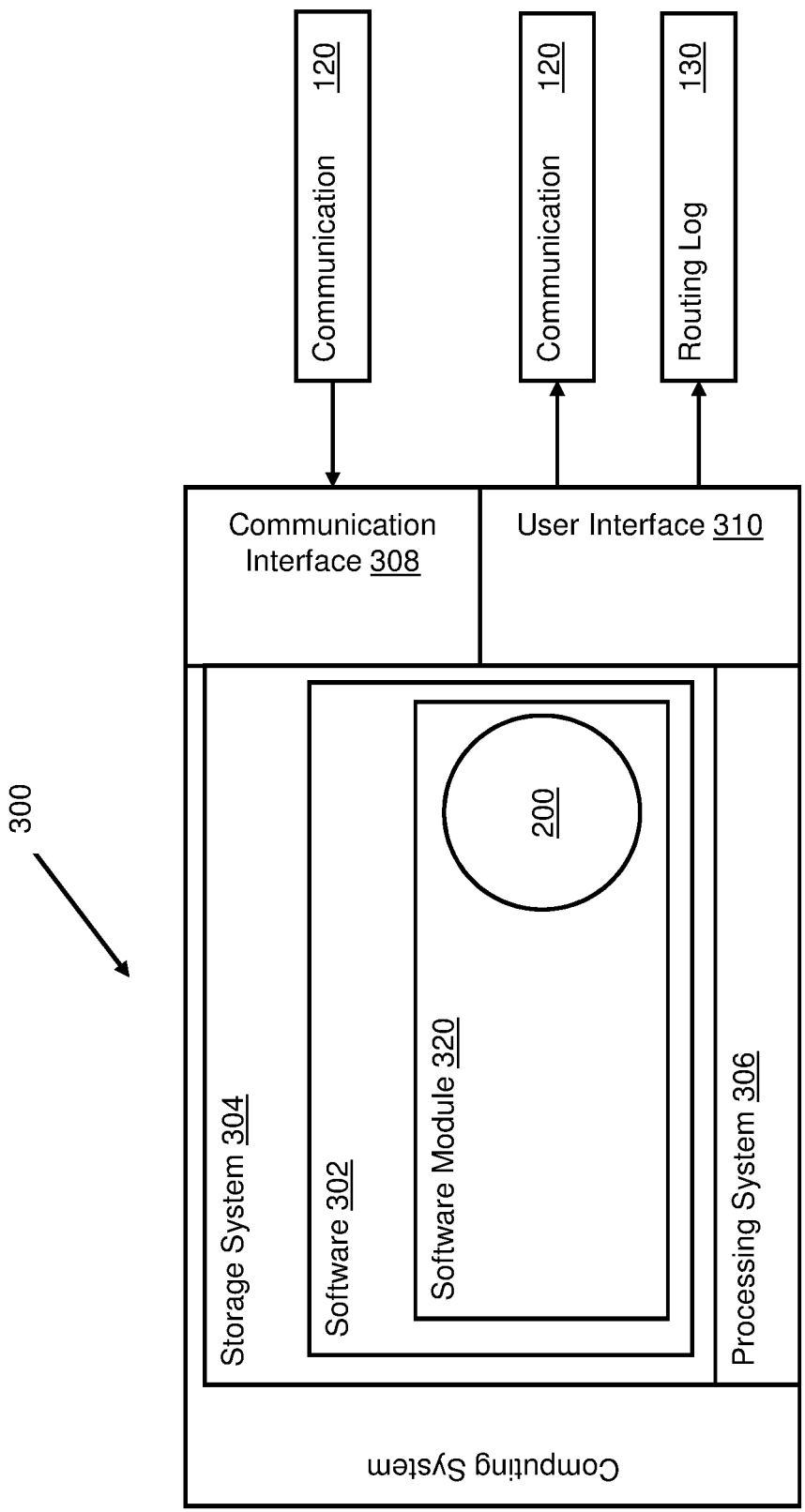
FIG. 3 depicts an exemplary embodiment of a system for logging communication routing.

FIG. 3 depicts an exemplary embodiment of system 300 for logging communication routing.

System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes a software module 320 for performing the function of SRE software module 111. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or sub-systems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

User interface 310 can include one or more CEC desktops 140, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display communications 120, routing log 130, CEC desktop 140, or another interface further associated with embodiments of the system and method as disclosed herein. Speakers, printers, haptic devices and other types of output devices may also be included in the user interface 310. A CSR or other staff can communicate with computing system 300 through the user interface 310 in order to view communication 120 or routing log 130, enter client input, manage an interaction, or any number of other tasks the CSR or other staff may want to complete with computing system 300.

As described in further detail herein, computing system 300 receives and transmits data through communication interface 308. In embodiments, the communication interface 308 operates to send and/or receive data, such as, but not limited to, communication 120 to/from other devices and/or systems to which computing system 300 is communicatively connected, and to receive and process client input, as described in greater detail above. The client input can include communication 120, details about a request, work order or other set of information that will necessitate an interaction between the client and the agent. Client input may also be made directly to the CSR, as described in further detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for logging, within a customer engagement center (CEC) system routing decisions for an incoming communication, comprising:
   receiving, at a system entry point to the CEC system, an incoming customer communication from a customer originating from outside the CEC system, wherein the incoming customer communication is drafted by a human person, further wherein the system entry point comprises one of a telephone, an IVR system, an electronic mail or messaging system, or a scanner;
   creating a routing log associated with the incoming customer communication, wherein the routing log includes a log entry for each system routing point and each manual routing point to which the incoming customer communication is routed, wherein the routing log is updated each time the incoming customer communication is routed between system routing points and manual routing points, wherein each log entry includes an indication of whether the incoming customer communication was manually routed or automatically routed to a system routing point;
   initializing the routing log with an initial log entry denoting the system entry point to the CEC system and denoting identification information for the customer who authored the incoming communication;
   routing the incoming customer communication and the initialized routing log from the system entry point to one of the system routing points;
   updating the initialized routing log with a first decision log entry, the first decision log entry including a reason for routing the incoming communication to the system routing point, the reason for routing including a textual statement delineating what caused the system to route the incoming customer communication to the system routing point;
   routing the incoming customer communication and the updated initialized routing log from the system routing point to a customer service representative (CSR);
   updating the updated initialized routing log with a second decision log entry, wherein the second decision log entry includes a reason for routing the incoming communication to the CSR, wherein the reason for routing includes context of a decision to route the incoming communication and updated initialized routing log to the CSR;
   transmitting the incoming customer communication and the updated initialized routing log to the CSR;
   displaying the updated initialized routing log to the CSR; and
   displaying the incoming customer communication to the CSR.

2. The method of claim 1, further comprising repeating routing the incoming customer communication and the initialized routing log at a system routing point and updating the initialized routing log with a decision log entry until no more system routing points remain.

3. The method of claim 2, wherein a number of system routing points may vary from system to system or from instance to instance of receiving a communication.

4. The method of claim 1, further comprising storing a copy of at least one of the incoming customer communication or the initialized updated routing log in internal or external storage.

5. The method of claim 1, further comprising transmitting the incoming customer communication and the initialized updated routing log to an external section for analysis.

6. The method of claim 1, further comprising repeating routing the incoming customer communication and initialized routing log at a system routing point, updating the initialized routing log with a decision log entry, transmitting the incoming customer communication and the initialized updated routing log, opening the initialized updated routing log for display, and opening the incoming customer communication for display.

7. The method of claim 1, wherein the routing log is at least one of: a separate document from the incoming customer communication, attached to the incoming customer communication, or appended to a body of the incoming customer communication.

8. The method of claim 1, wherein the initial log entry also includes at least one of: a type of communication, a date and time of entry, and information on initial entry of the incoming customer communication.

9. The method of claim 1, wherein the system routing point may be an automated decision using predetermined criteria or a manual evaluation by reviewing staff.

10. The method of claim 1, wherein each decision log entry includes at least one of: the system routing point, or a destination.

11. The method of claim 1, wherein the incoming customer communication and the initialized updated routing log are transmitted to at least one of: a specific CSR, a group of CSRs, a specific queue, or a group of queues.

12. The method of claim 1, wherein the initialized updated routing log automatically opens on a CEC desktop before the CSR opens the incoming customer communication.

13. The method of claim 1, wherein the initialized updated routing log opens simultaneously with the incoming customer communication.

14. The method of claim 1, wherein the initialized updated routing log requires some input from the CSR to open.

15. A system for logging, within a customer engagement center (CEC) system, routing decisions for an incoming communication, comprising:
   a processor; and
   a non-transitory computer readable medium programmed with computer readable code that upon execution by the processor causes the processor to:
   receive, at a system entry point to the CEC system, an incoming customer communication from a customer originating from outside the CEC, wherein the incoming customer communication is drafted by a human person, further wherein the system entry point to the CEC comprises one of a telephone, an IVR system, an electronic mail or messaging system, or a scanner;
   create a routing log associated with the incoming customer communication, wherein the routing log includes a log entry for each system routing point to which the incoming customer communication is routed, wherein the routing log is updated each time the incoming customer communication is routed, wherein each log entry includes an indication of whether the incoming customer communication was manually routed or automatically routed to a system routing point;

initialize the routing log with an initial log entry denoting the system entry point to the CEC system and denoting identification information for the customer who authored the incoming customer communication;

route the incoming customer communication and the initialized routing log from the system entry point to one of the system routing points;

update the initialized routing log with a first decision log entry, the first decision log entry including a reason for routing the incoming communication to the system routing point, the reason for routing including a textual statement delineating what caused the system to route the incoming customer communication to the system routing point:

route the incoming customer communication and the initialized updated routing lost from the system routing point to a customer service representative (CSR);

update the initialized updated routing log with a second decision log entry, wherein the second decision log entry includes a reason for routing the incoming customer communication to the CSR, wherein the reason for routing includes contest of a decision to route the incoming communication and initialized updated routing log to the CSR;

transmit the incoming customer communication and the initialized updated routing log to the CSR;

display the initialized updated routing log to the CSR; and display the incoming customer communication to the CSR.

16. The system of claim 15, wherein the processor is a smart routing engine.

17. The system of claim 15, wherein the processor is at least one of: an IVR system, a rules engine, a workforce optimization system, a back office handling system, or any combination thereof.

18. The system of claim 15, wherein the incoming customer communication is at least one of: a live telephone call, a recorded telephone call, information gathered or transcribed from a telephone call, a voice mail message, email, an online posting, a direct message from a customer, a communication from a third party, a message from a customer forwarded by a third party, an electronic copy of mail sent by post or courier, or any combination thereof.

19. A non-transitory computer readable medium programmed with computer readable code for logging, within a customer engagement center (CEC) system, routing decisions for an incoming communication that upon execution by a processor causes the processor to:

receive, at a system entry point for the CEC system an incoming customer communication from a customer originating from outside the CEC system, wherein the incoming customer communication is drafted by a human person, further wherein the system entry point comprises one of a telephone, an IVR system, an electronic mail or messaging system;

create a routing log associated with the incoming customer communication, wherein the routing log includes a log entry for each system routing point to which the incoming customer communication is routed, wherein the routing log is updated each time the incoming customer communication is routed, wherein each log entry includes an indication of whether the incoming customer communication was manually routed or automatically routed to a system routing point;

initialize the routing log with an initial log entry denoting the system entry point and denoting identification information for the customer who authored the incoming customer communication;

route the incoming customer communication and the initialized routing log from the system entry point to one of the system routing points:

update the initialized routing log with a first decision log entry, the first decision log entry including a reason for routing the incoming communication to the system routing point, the reason for routing including a textual statement delinealing what caused the system to route the incoming customer communication to the system routing point;

route the incoming customer communication and the initialized updated routing log from the system routing point to a customer service representative (CSR);

update the initialized updated routing log with a second decision log entry, wherein the second decision log entry includes a reason for routing the incoming communication to the CSR, wherein the reason for routing includes context of a decision to route the incoming communication and the initialized updated routing log to the CSR;

transmit the incoming customer communication and the initialized updated routing log to the CSR;

display the initialized updated routing log to the CSR; and display the incoming customer communication to the CSR.

* * * * *